US012741293B2

(12) United States Patent
Enomura

(10) Patent No.: US 12,741,293 B2
(45) Date of Patent: Sep. 22, 2026

(54) DISPERSER AND METHOD FOR USING SAME

(71) Applicant: M. TECHNIQUE CO., LTD., Izumi (JP)

(72) Inventor: Masakazu Enomura, Izumi (JP)

(73) Assignee: M. TECHNIQUE CO., LTD., Izumi (JP)

( * ) Notice: Subject to any disclaimer, the term of this patent is extended or adjusted under 35 U.S.C. 154(b) by 227 days.

(21) Appl. No.: 18/291,520

(22) PCT Filed: Aug. 9, 2022

(86) PCT No.: PCT/JP2022/030382
§ 371 (c)(1),
(2) Date: Jan. 23, 2024

(87) PCT Pub. No.: WO2024/034002
PCT Pub. Date: Feb. 15, 2024

(65) Prior Publication Data

US 2025/0091060 A1 Mar. 20, 2025

(51) Int. Cl.
*B05B 3/02* (2006.01)

(52) U.S. Cl.
CPC ........................................ *B05B 3/02* (2013.01)

(58) Field of Classification Search
CPC ........ B05B 3/02; B01F 27/053; B01F 27/272; B01F 27/94; B01F 35/512; B01F 35/92; B01F 35/95
See application file for complete search history.

(56) References Cited

U.S. PATENT DOCUMENTS

| | | | |
|---|---|---|---|
| 2,817,500 | A | 12/1957 | Robinson |
| 5,772,929 | A | 6/1998 | Enomura et al. |
| 2023/0022084 | A1 | 1/2023 | Enomura |

FOREIGN PATENT DOCUMENTS

| | | | |
|---|---|---|---|
| DE | 1 067 720 | B3 | 10/1959 |
| DE | 197 07 165 | A1 | 8/1998 |

(Continued)

OTHER PUBLICATIONS

English translation (Year: 2020).*

(Continued)

*Primary Examiner* — Qingzhang Zhou
(74) *Attorney, Agent, or Firm* — Birch, Stewart, Kolasch & Birch, LLP

(57) ABSTRACT

A disperser includes an outer member having a tapered inner circumferential surface, an inner member having a tapered outer circumferential surface that faces the tapered inner circumferential surface, and a clearance adjustment part that allows a clearance distance between the tapered inner circumferential surface and the tapered outer circumferential surface to be adjusted by moving the outer member and the inner member relative to each other. A flow path is formed between the inner circumferential surface of the outer member and the outer circumferential surface of the inner member, through which fluid flows from one side to the other side. The flow path includes a dispersion region defined by the tapered inner circumferential surface and the tapered outer circumferential surface. The tapered inner circumferential surface and the tapered outer circumferential surface are formed such that the angle of one with respect to the other in the axial cross section changes in the middle of the dispersion region.

12 Claims, 6 Drawing Sheets

(56) References Cited

FOREIGN PATENT DOCUMENTS

| | | | | |
|---|---|---|---|---|
| EP | 1 359 997 | B1 | 2/2006 | |
| EP | 4 537 928 | A1 | 4/2025 | |
| JP | 3-79834 | U | 8/1991 | |
| JP | 4-114724 | A | 4/1992 | |
| JP | 9-24269 | A | 1/1997 | |
| JP | 2005-334711 | A | 12/2005 | |
| JP | 2005-334712 | A | 12/2005 | |
| JP | 2013-188671 | A | 9/2013 | |
| JP | 6762058 | B1 * | 9/2020 | .............. B01J 19/18 |
| JP | 2021-105507 | A | 7/2021 | |
| WO | WO 2006/042491 | A2 | 4/2006 | |
| WO | WO-2020136923 | A1 * | 7/2020 | ........... C07C 67/343 |

OTHER PUBLICATIONS

Japanese Office Action for Japanese Application No. 2023-580494, dated Feb. 25, 2025, with an English translation.

Extended European Search Report for European Application No. 22951357.7, dated Mar. 9, 2026.

Indian Examination Report and Search Report for Indian Application No. 202417004770, dated Apr. 10, 2026, with English translation.

* cited by examiner

DISPERSER AND METHOD FOR USING SAME

TECHNICAL FIELD

The present disclosure relates to a disperser capable of producing nanoparticles by low-power dispersing. Specifically, the present disclosure relates to a high-performance disperser capable of nano-level dissolution and macromolecular dissolution as well as nanoparticle production, which can also be used for crystallization and emulsion polymerization, and a method for using the same.

BACKGROUND ART

In the pharmaceutical and chemical industries, nanoparticles have entered the stage of practical use. For example, vaccines against novel coronavirus infection (COVID-19) are known worldwide. RNA vaccines are the first COVID-19 vaccines to be authorized in the United States and the European Union. The RNA vaccine contains ribonucleic acid (RNA), and when introduced into human tissue, messenger RNA (mRNA) induces cells to produce foreign proteins and stimulates an adaptive immune response, teaching the body how to identify and destroy the corresponding pathogen. Although not always the case, RNA vaccines often use nucleotide-modified mRNA. The delivery of mRNA is achieved by a co-formulation of the molecule into lipid nanoparticles, which protect the RNA strands and help their absorption into the cells. The particle size is said to be 100 nm. In addition, other types of vaccines such as virus-like particle vaccines and DNA plasmid vaccines are in clinical trials, and many nanospheres, liposomes, nanoemulsions, and the like are being developed. Therefore, there is a need for a disperser that produces ultrafine particles with controlled shear force, especially one that can produce fine particles for injection.

Patent Document 1 discloses a high-performance stirring disperser. In the disperser, blades rotate at high speed in a tank, and a screen with slits rotates at high speed in the opposite direction to the blades, creating a jet stream that provides a shear force to atomize a fluid into fine particles. The problem with the disperser is that it requires a lot of power.

Patent Document 2 discloses a manufacturing method for producing lipid emulsions and liposomes in a short time and with low power. In this manufacturing method, a phospholipid-containing material to be treated is pressurized and subjected to high-speed rotation to atomize it into fine particles. At this time, air spaces are eliminated because if they are present in the dispersion tank, many small air bubbles are mixed into the material to be treated, creating a pseudo-compressible fluid and making it difficult to properly apply a shear force. The manufacturing method also requires a considerable amount of power.

Patent Document 3 discloses a flow reactor (continuous reactor) that has a high heat exchange rate and can be disassembled. Although excellent as a flow reactor, it has too little shear force to be used as a disperser, and it is difficult for the reactor to produce nanoparticles for the above-mentioned vaccines or the like.

Patent Document 4 discloses a gap shear disperser that includes a conical rotor and a conical vessel with a sloped inner wall that concentrically houses the rotor. The shear disperser is designed for uniform atomization of viscous materials such as pastes. Considering the structure and the center runout caused by the rotation of the rotor, it is difficult to make the gap between the rotor and the vessel in microns. Even if the gap between the rotor and the vessel is made in microns, due to the hollowing phenomenon that occurs in the gap when a viscous fluid is treated, it is difficult to apply a shear force to the material being treated.

PRIOR ART DOCUMENT

Patent Document

Patent Document 1: Japanese Unexamined Patent Application Publication No. H04-114724
Patent Document 2: Japanese Unexamined Patent Application Publication No. H09-24269
Patent Document 3: Japanese Unexamined Patent Application Publication No. 2021-105507
Patent Document 4: Japanese Unexamined Utility Model Application Publication No. H03-79834

SUMMARY OF THE INVENTION

Problems to be Solved by the Invention

In view of the foregoing, it is an object of the present disclosure to provide a disperser capable of producing fine particles, especially nanoparticles, by efficiently applying a shear force to a material to be treated with low power, and a method for using the same.

Means for Solving the Problems

To achieve the object mentioned above, according to the first aspect of the invention, a disperser includes: a cylindrical outer member extending in a predetermined direction and having a tapered inner circumferential surface as a part of the inner circumferential surface thereof; an inner member located radially inside the outer member and having a tapered outer circumferential surface as a part of the outer circumferential surface thereof, the tapered outer circumferential surface facing the tapered inner circumferential surface of the outer member; and a clearance adjustment part that allows a distance clearance between the tapered inner circumferential surface and the tapered outer circumferential surface to be adjusted by moving the outer member and the inner member relative to each other in the predetermined direction. A flow path is formed between the inner circumferential surface of the outer member and the outer circumferential surface of the inner member, through which fluid flows from one side to the other side in the predetermined direction. The flow path includes a dispersion region defined by the tapered inner circumferential surface and the tapered outer circumferential surface. The tapered inner circumferential surface and the tapered outer circumferential surface are formed such that the angle of one with respect to the other (the angle therebetween) in a cross section in the predetermined direction changes in the middle of the dispersion region.

According to the second aspect of the invention, in the disperser of the first aspect, the dispersion region of the flow path includes: a reduction region where the clearance distance decreases from the one side to the other side, and a constant region extending continuously from the reduction region to the other side, where the clearance distance is constant.

According to the third aspect of the invention, in the disperser of the first or second aspect, the clearance adjustment part includes: a fixing member that supports the inner member to be slidable in the predetermined direction and is fixed to the outer member, and a differential screw configured to slide the inner member in the predetermined direction with respect to the fixing member.

According to the fourth aspect of the invention, in the disperser of the first or second aspect, the clearance adjustment part can be used to selectively place the disperser in any one of the following states without disassembling the outer member and the inner member: a contact state in which the tapered inner circumferential surface and the tapered outer circumferential surface are in contact with each other, a use state in which the disperser is used and the clearance distance is small, and a separate state in which the clearance distance is larger than in the use state.

According to the fifth aspect of the invention, in the disperser of the second aspect, the constant region of the dispersion region of the flow path has a length of 1 mm or more from the one side to the other side along the flow path direction in the cross section in the predetermined direction.

According to the sixth aspect of the invention, in the disperser of the second aspect, in the constant region of the dispersion region of the flow path, the clearance distance is 0.1 μm or more and 2 mm or less.

According to the seventh aspect of the invention, in the disperser of the second aspect, regions of the tapered inner circumferential surface and the tapered outer circumferential surface that define the constant region of the dispersion region of the flow path are made of ceramic.

According to the eighth aspect of the invention, in the disperser of the first or second aspect, the inner circumferential surface of the outer member and the outer circumferential surface of the inner member that define the flow path have no horizontal portion where the fluid flowing through the flow path may accumulate.

According to the ninth aspect of the invention, in the disperser of the first or second aspect, the inner circumferential surface of the outer member and the outer circumferential surface of the inner member that define the flow path are covered with a coating made of a corrosion-resistant material.

According to the tenth aspect of the invention, in the disperser of the ninth aspect, the coating is a fluoropolymer coating.

According to the eleventh aspect of the invention, in the disperser of the first or second aspect, at least one of the outer member and the inner member has a jacket through which another fluid can flow to adjust the temperature of the fluid flowing through the flow path.

According to the twelfth aspect of the invention, a method for using the disperser of the fourth aspect includes adjusting the clearance distance to place the disperser in the use state. The adjusting includes: bringing the outer member and the inner member into contact with each other by using the clearance adjustment part to bring the disperser into the contact state; and thereafter separating the tapered inner circumferential surface from the tapered outer circumferential surface to bring the disperser into the use state.

According to the thirteenth aspect of the invention, a method for using the disperser of the fourth aspect includes separating the outer member and the inner member from each other by using the clearance adjustment part to bring the disperser into the separate state for cleaning or sterilization of the flow path.

Effects of the Invention

According to the present disclosure, shear force can be efficiently applied to a material to be treated with low power to produce fine particles, especially nanoparticles.

BRIEF DESCRIPTION OF THE DRAWINGS

FIG. 3A illustrates a contact state, FIG. 3B illustrates a use state, and FIG. 3C illustrates a separate state.

MODES FOR CARRYING OUT THE INVENTION

Figure 1:
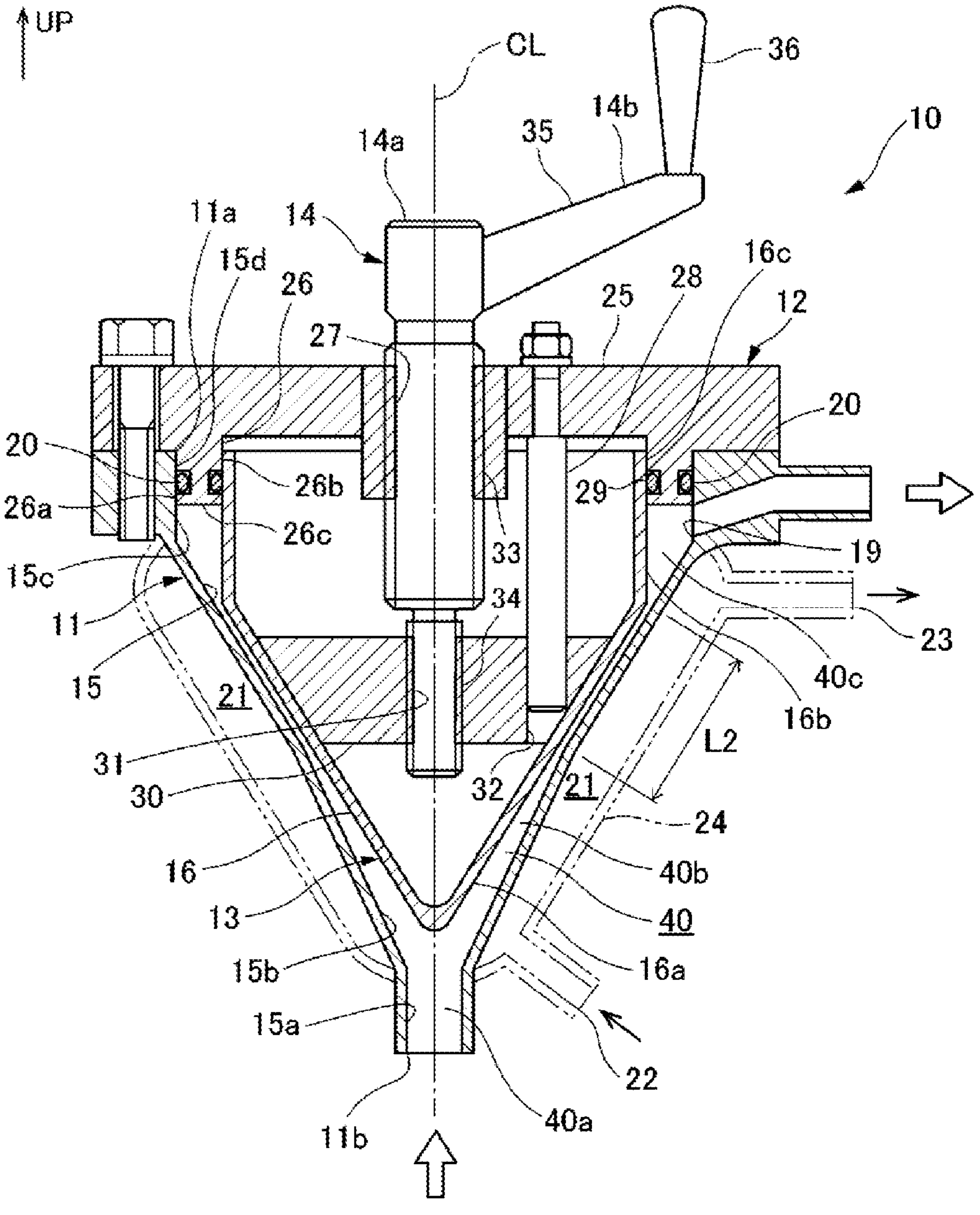
FIG. 1 is an axial cross-sectional view of a disperser according to a first embodiment of the present invention.

Hereinafter, exemplary embodiments of the present invention will be described with reference to the accompanying drawings. In the drawings, the arrow "UP" indicates upward, and the line "CL" indicates the central axis of an outer member and an inner member. In the following description, the axial direction refers to a direction along the central axis CL of the outer member and the inner member, while the radial direction refers to a direction perpendicular to the central axis CL. In addition, the white arrow in the drawings indicates the direction of the flow of fluid to be treated. In the following description, the axial direction (predetermined direction) corresponds to the vertical direction (up-down direction), and one side in the axial direction is referred to as the lower side, while the other side in the axial direction is referred to as the upper side.

The disperser of this disclosure is a device that can produce nanoparticles from a fluid as a material to be treated (hereinafter referred to as "fluid to be treated" or simply "fluid") by finely dispersing the fluid. Note that "disperser" is a general term for equipment used to apply a shear force to a fluid to be treated to obtain a treated product. The disperser may be used not only for the production of fine particles such as nanoparticles, but also for the production of emulsions, liposomes, nanospheres, and the like, as well as for polymer dissolution, complete mixing at the molecular level, crystallization, and emulsion polymerization. In addition, the term "fluid" refers not only to gases and liquids, but also to powders, granules, slurries, and other fluid materials.

Figure 2:
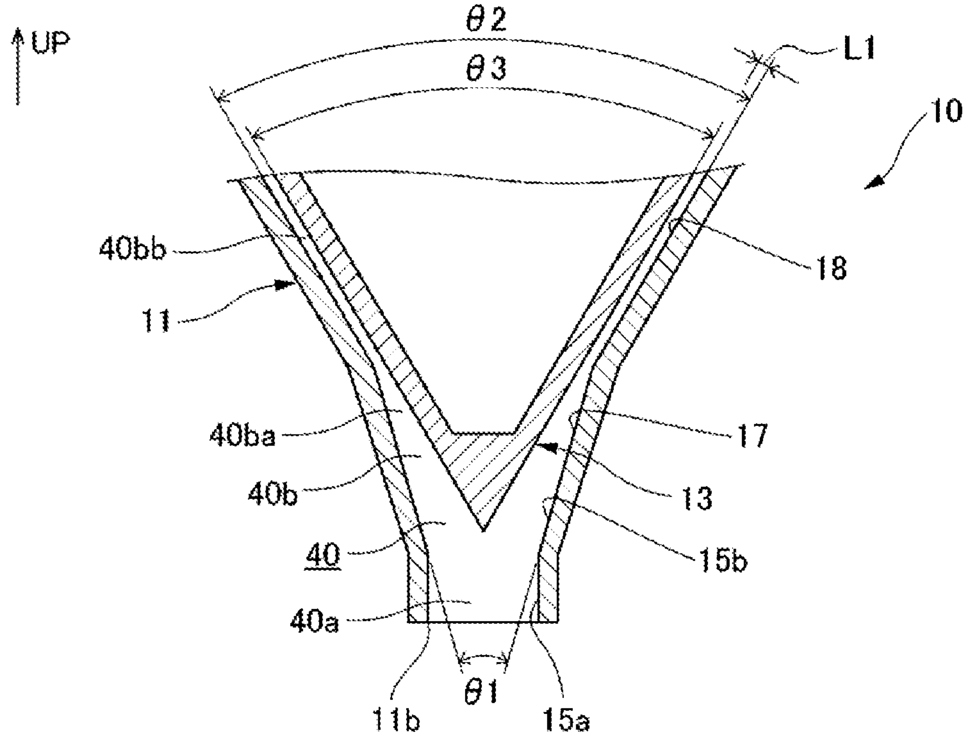
FIG. 2 is an enlarged view of the main parts of the disperser illustrated in FIG. 1.

FIG. 1 is an axial cross-sectional view of a disperser according to a first embodiment of the present invention. FIG. 2 is an enlarged view of the main parts of the disperser illustrated in FIG. 1.

As illustrated in FIG. 1, a disperser 10 of the first embodiment includes an outer member 11, a fixing member 12 (clearance adjustment part), an inner member 13, and a differential screw 14 (clearance adjustment part). The outer member 11 is formed in a cylindrical shape extending in a predetermined direction (the vertical direction in this embodiment). The fixing member 12 is fixed to the outer member 11. The inner member 13 is located radially inside the outer member 11 and is slidably supported by the fixing member 12. The differential screw 14 is attached to the fixing member 12 and the inner member 13.

The outer member 11 and the inner member 13 are concentrically arranged so that their central axes CL coincide. There is a gap (space) between an inner circumferential surface 15 of the outer member 11 and an outer circumferential surface 16 of the inner member 13, and the gap serves as a flow path 40 through which a fluid to be treated flows. The flow path 40 allows the fluid to be treated to flow from the lower side (one side in the predetermined direction) to the upper side (the other side in the predetermined direction). Unless otherwise specified, the following describes the structure of the disperser 10 in a state where the outer member 11, the fixing member 12, the inner member 13, and the differential screw 14 are assembled and ready for use (hereinafter referred to as "use state").

The outer member 11 is formed in a cylindrical shape whose central axis CL extends in a predetermined direction (the vertical direction in this embodiment). The outer member 11 has an upper end opening 11*a* at the upper end, a lower end opening 11*b* at the lower end, and the inner circumferential surface 15 extending between the upper end opening 11*a* and the lower end opening 11*b*. The upper end opening 11*a* and the lower end opening 11*b* are arranged to be concentric with the central axis CL. In this embodiment, the upper end opening 11*a* is formed to have a larger diameter than the lower end opening 11*b*. The upper end opening 11*a* of the outer member 11 serves as an insertion port for inserting the inner member 13 into the outer member 11.

The inner circumferential surface 15 of the outer member 11 defines a space (hereinafter referred to as "internal space") therein. In this embodiment, the inner circumferential surface 15 of the outer member 11 includes four regions, one on top of another, each having a surface with a different function. In other words, the inner circumferential surface 15 of the outer member 11 includes four surfaces with different functions: an inflow inner circumferential surface 15*a*, a tapered inner circumferential surface 15*b*, an outflow inner circumferential surface 15*c*, and a sealing inner circumferential surface 15*d*, in this order from bottom to top. That is, the outer member 11 has the tapered inner circumferential surface 15*b* as a part of the inner circumferential surface 15. The inflow inner circumferential surface 15*a*, the tapered inner circumferential surface 15*b*, and the outflow inner circumferential surface 15*c* of the outer member 11 define the radially outer side of the flow path 40.

The inflow inner circumferential surface 15*a* of the outer member 11 is located below the tapered inner circumferential surface 15*b* and extends continuously from the lower end opening 11*b* of the outer member 11 to the lower end of the tapered inner circumferential surface 15*b*. In this embodiment, the inflow inner circumferential surface 15*a* is formed in a cylindrical shape. The inflow inner circumferential surface 15*a* defines the radially outer side of a space (an inflow region 40*a*, described later) into which the fluid to be treated first flows. The lower end opening 11*b* of the outer member 11 is connected to a supply source (not illustrated) for pumping the fluid to be treated and allows the fluid to flow into the flow path 40. In this embodiment, the supply source (not illustrated) pumps the fluid to be treated from the lower end opening 11*b* of the outer member 11 into the flow path 40 at a pressure of 0.5 MPaG.

The tapered inner circumferential surface 15*b* of the outer member 11 is a tapered (conical) surface and extends upward continuously from the inflow inner circumferential surface 15*a*. In this embodiment, the tapered inner circumferential surface 15*b* is tapered from the top to the bottom. The tapered inner circumferential surface 15*b* defines the radially outer side of a space (a dispersion region 40*b*, described later) in which the fluid to be treated can be dispersed. The vertex (not illustrated) of the tapered profile of the tapered inner circumferential surface 15*b* is located on the central axis CL.

As illustrated in FIG. 2, in this embodiment, the tapered inner circumferential surface 15*b* has two regions with different taper angles: an upper region and a lower region. Specifically, the tapered inner circumferential surface 15*b* has a lower region 17 with a smaller taper angle θ1 and an upper region 18 with a taper angle θ2 larger than that of the lower region 17 ($\theta 1<\theta 2$). The upper region 18 extends upward from the upper end of the lower region 17 (the lower end of the upper region 18). In other words, the taper angle of the tapered inner circumferential surface 15*b* changes at a predetermined height position in the middle of the tapered inner circumferential surface 15*b*. As used herein, the term "taper angle" refers to the angle between the surfaces on both sides in a cross section in the axial direction along the central axis CL.

The outflow inner circumferential surface 15*c* of the outer member 11 extends upward continuously from the upper end of the tapered inner circumferential surface 15*b*. In this embodiment, the outflow inner circumferential surface 15*c* is formed in a cylindrical shape. The outflow inner circumferential surface 15*c* is provided with an outlet 19 to allow the fluid to flow out of the flow path 40. The outflow inner circumferential surface 15*c* defines the radially outer side of a space (an outflow region 40*c*, described later) in which the fluid is present before flowing out of the flow path 40.

The sealing inner circumferential surface 15*d* of the outer member 11 is located above the flow path 40 and extends upward from the upper end of the outflow inner circumferential surface 15*c*. In this embodiment, the sealing inner circumferential surface 15*d* is formed in a cylindrical shape extending continuously from the outflow inner circumferential surface 15*c*. The sealing inner circumferential surface 15*d* of the embodiment is in close proximity to or in contact with an outer circumferential surface 26*a* of an insertion portion 26 (described later) of the fixing member 12 and does not define the flow path 40. The fixing member 12 is provided with a sealing member 20 (e.g., an O-ring) (described later) which comes into contact with the sealing inner circumferential surface 15*d*. Thereby, the sealing inner circumferential surface 15*d* restricts the flow of the fluid upward from the flow path 40. In this embodiment, the fixing member 12 is provided with the sealing member 20; however, the embodiment is not so limited, and the sealing inner circumferential surface 15*d* of the outer member 11 may be provided with the sealing member 20.

As indicated by the dash-dot-dot line in FIG. 1, the outer member 11 may be provided with a jacket 21 (space) through which other fluids can flow to adjust the temperature of the fluid to be treated (fluid) in the flow path 40. For example, the jacket 21 is provided over the entire area from a height position corresponding to the lower end of the tapered inner circumferential surface 15*b* of the outer member 11 to a height position near the lower end of the outlet 19 in the outflow inner circumferential surface 15*c*. The jacket 21 is provided with an inlet 22 at its lower end to allow the other fluids to flow therein. The jacket 21 is also provided with an outlet 23 at its upper end to allow the other fluids to flow out therefrom. Examples of the other fluids include steam, hot water, cold water, gas (nitrogen gas, etc.), and other heat transfer media. As indicated by the dash-dot-dot line in FIG. 1, a jacket forming member 24, which is formed separately from the outer member 11, may be integrated with the outer member 11 while being spaced apart from the outer circumferential surface of the outer member 11 to thereby form the jacket 21 along the outer circumferential surface of the outer member 11. Alternatively, a space may be provided within the thickness of the outer member 11 to serve as the jacket 21 without the use of the jacket forming member 24.

The fixing member 12 is fixed (e.g., fastened and secured) to the outer member 11. The fixing member 12 includes a lid portion 25 that closes the upper end opening 11*a* of the outer member 11 and the cylindrical insertion portion 26 that is inserted into the upper end opening 11*a* of the outer member 11 from above.

The lid portion 25 of the fixing member 12 is formed to have a larger diameter than the upper end opening 11*a* of the outer member 11. The lid portion 25 has a through hole that passes therethrough in the vertical (axial) direction at a predetermined position radially inside the cylindrical insertion portion 26 (in this embodiment, the center of the lid portion 25 centered on the central axis CL). The through hole is provided with a female threaded portion 27 formed in its inner circumferential surface. The lid portion 25 also has a rotation preventing pin 28 that extends along the axial direction and is fixed at a different position than the female threaded portion 27 radially inside the cylindrical insertion portion 26. The pin 28 is removably attached to the lid portion 25 and, when fixed to the lid portion 25, extends downward along the axial direction from the lower surface of the lid portion 25.

The cylindrical insertion portion 26 of the fixing member 12 has the outer circumferential surface 26*a* that is in close proximity to or in contact with the sealing inner circumferential surface 15*d* of the outer member 11 and faces the same, an inner circumferential surface 26*b* that slidably supports the inner member 13, and a lower surface 26*c* that defines the upper part of the flow path 40. The outer circumferential surface 26*a* of the insertion portion 26 is formed to have a circular cross section with a slightly smaller diameter than the sealing inner circumferential surface 15*d* of the outer member 11, and it faces the sealing inner circumferential surface 15*d*. The outer circumferential surface 26*a* of the insertion portion 26 is provided with the sealing member 20 (e.g., an O-ring). While in contact with the sealing inner circumferential surface 15*d* of the outer member 11 over the entire circumference, the sealing member 20 seals between the outer circumferential surface 26*a* of the insertion portion 26 and the sealing inner circumferential surface 15*d* and restricts the flow of the fluid upward from the flow path 40. The inner circumferential surface 26*b* of the insertion portion 26 is formed to have a circular cross section and is provided with a sealing member 29 (e.g., an O-ring). While in contact with the outer circumferential surface 16 of the inner member 13 over the entire circumference, the sealing member 29 seals between the inner circumferential surface 26*b* of the insertion portion 26 and the outer circumferential surface 16 and restricts the flow of the fluid upward from the flow path 40. In this embodiment, the fixing member 12 is provided with the sealing members 20 and 29; however, the embodiment is not so limited. The inner circumferential surface 15 of the outer member 11 may be provided with the sealing member 20, and the outer circumferential surface 16 of the inner member 13 may be provided with the sealing member 29.

The inner member 13 is located radially inside the outer member 11 (the internal space of the outer member 11) and is slidably supported by the fixing member 12. In other words, the inner member 13 is movable in the axial direction with respect to the outer member 11 through the fixing member 12. In this embodiment, the inner member 13 is inserted into the internal space of the outer member 11 from the upper end opening 11*a* of the outer member 11 while being supported by the fixing member 12. The inner member 13 has the outer circumferential surface 16 that defines the flow path 40 between it and the inner circumferential surface 15 of the outer member 11.

The inner member 13 of the embodiment is formed in a bottomed cylindrical shape with an opening at the top. The inner member 13 is provided with a supported portion 30 which is supported by the differential screw 14 in its internal space.

The supported portion 30 of the inner member 13 has a through hole that is coaxial with the female threaded portion 27 of the fixing member 12. The through hole is provided with a female threaded portion 31 formed in its inner circumferential surface. In this embodiment, the female threaded portion 31 of the through hole has a diameter smaller than that of the female threaded portion 27 of the fixing member 12. The female threaded portion 31 of the supported portion 30 has threads formed at a shorter pitch than the threads of the female threaded portion 27 of the fixing member 12. For example, the threads of the female threaded portion 31 of the supported portion 30 are formed at a pitch of 1.8 mm, while the threads of the female threaded portion 27 of the fixing member 12 are formed at a pitch of 2.0 mm. The supported portion 30 also has a pin insertion hole 32 through which the pin 28 of the fixing member 12 is inserted. The pin 28 passing through the pin insertion hole 32 allows the inner member 13 to move in the axial direction with respect to the fixing member 12 and restricts the rotation of the inner member 13 relative to the fixing member 12. Incidentally, the internal space of the inner member 13 may serve as a jacket through which the other fluids mentioned above can flow to adjust the temperature of the fluid to be treated (fluid) in the flow path 40. The fluid flowing through the jacket (internal space) of the inner member 13 may be the same fluid as that flowing through the jacket 21 of the outer member 11, or it may be a different fluid.

The outer circumferential surface 16 of the inner member 13 defines the radially inner side of the flow path 40 and includes three regions, one on top of another, each having a surface with a different function. In other words, the outer circumferential surface 16 of the inner member 13 includes three surfaces with different functions: a tapered outer circumferential surface 16*a*, an outflow outer circumferential surface 16*b*, and a sealing outer circumferential surface 16*c*, in this order from bottom to top. That is, the inner member 13 has the tapered outer circumferential surface 16*a* as a part of the outer circumferential surface 16.

The tapered outer circumferential surface 16*a* of the inner member 13 is a tapered (conical) surface and faces the tapered inner circumferential surface 15*b* of the outer member 11 in a state of being spaced radially inward from the tapered inner circumferential surface 15*b*. In this embodiment, the tapered outer circumferential surface 16*a* extends continuously from the vertex of the lower end of the inner member 13 such that its diameter increases upward. In other words, the tapered outer circumferential surface 16*a* of the embodiment is tapered from the top to the bottom. Thus, the dispersion region 40*b* (described later) of the flow path 40 is defined between the tapered outer circumferential surface 16*a* and the tapered inner circumferential surface 15*b*. In this embodiment, the inner member 13 is formed such that the vertex of the tapered profile of the tapered outer circumferential surface 16*a* corresponds to the lower end of the inner member 13. The vertex of the tapered profile of the tapered outer circumferential surface 16*a* is located on the central axis CL.

As illustrated in FIG. 2, in this embodiment, the taper angle θ3 of the tapered outer circumferential surface 16*a* is set to be constant from the upper end to the lower end, differently from the tapered inner circumferential surface 15*b*. The taper angle θ3 of the tapered outer circumferential surface 16*a* is set to be the same as the taper angle θ2 of the upper region 18 of the tapered inner circumferential surface 15*b* (θ3=θ2).

The outflow outer circumferential surface 16*b* of the inner member 13 extends upward from the upper end of the tapered outer circumferential surface 16*a*. In this embodiment, the outflow outer circumferential surface 16*b* is formed in a cylindrical shape. The outflow outer circumferential surface 16*b* is located at a position spaced radially inward from the outflow inner circumferential surface 15*c* of the outer member 11 and defines a space (the outflow region 40*c*, described later) between it and the outflow inner circumferential surface 15*c*. The separation distance between the outflow outer circumferential surface 16*b* of the inner member 13 and the outflow inner circumferential surface 15*c* of the outer member 11 is set larger than the separation distance (clearance distance L1, described later) between the tapered outer circumferential surface 16*a* and the upper region 18 of the tapered inner circumferential surface 15*b*.

The sealing outer circumferential surface 16*c* of the inner member 13 is located above the flow path 40 and extends upward from the outflow outer circumferential surface 16*b*. In this embodiment, the sealing outer circumferential surface 16*c* is formed in a cylindrical shape extending continuously from the outflow outer circumferential surface 16*b*. The sealing outer circumferential surface 16*c* is formed to have a slightly smaller diameter than the inner circumferential surface 26*b* of the insertion portion 26 of the fixing member 12, and it faces the inner circumferential surface 26*b*. The sealing outer circumferential surface 16*c* is in close proximity to or in contact with the inner circumferential surface 26*b* of the insertion portion 26 of the fixing member 12 and does not define the flow path 40. The sealing member 29 on the inner circumferential surface 26*b* of the insertion portion 26 of the fixing member 12 comes into contact with the sealing outer circumferential surface 16*c*. While in contact with the sealing outer circumferential surface 16*c* of the inner member 13 over the entire circumference, the sealing member 29 restricts the flow of the fluid upward from the flow path 40.

The differential screw 14 is a member that allows the separation distance (hereinafter referred to as “clearance distance”) between the tapered inner circumferential surface 15*b* and the tapered outer circumferential surface 16*a* to be adjusted by moving the inner member 13 with respect to the outer member 11. The differential screw 14 integrally includes a shaft 14*a* and a handle 14*b*.

The shaft 14*a* of the differential screw 14 extends linearly in the axial direction and is inserted through the through hole of the fixing member 12 having the female threaded portion 27 formed therein and the through hole of the inner member 13 having the female threaded portion 31 formed therein. The upper end of the shaft 14*a* protrudes upward from the lid portion 25 of the fixing member 12. The shaft 14*a* has a first male threaded portion 33 that is threaded into the female threaded portion 27 of the fixing member 12 and a second male threaded portion 34 that is threaded into the female threaded portion 31 of the inner member 13. In this embodiment, the first male threaded portion 33 is formed to have a larger diameter than the second male threaded portion 34. The pitch of the threads of the first male threaded portion 33 is set longer than the pitch of the threads of the second male threaded portion 34. For example, the threads of the first male threaded portion 33 are formed at a pitch of 2.0 mm, while the threads of the second male threaded portion 34 are formed at a pitch of 1.8 mm. Thus, when the differential screw 14 is turned once, the inner member 13 slides 0.2 mm in the axial direction with respect to the outer member 11. In this embodiment, the supported portion 30 of the inner member 13 is provided with the female threaded portion 31, and the differential screw 14 is provided with the second male threaded portion 34; however, the embodiment is not so limited. For example, the supported portion 30 of the inner member 13 may be provided with a male threaded portion in place of the female threaded portion 31, while the differential screw 14 may be provided with a female threaded portion that is threaded with the male threaded portion in place of the second male threaded portion 34.

The handle 14*b* of the differential screw 14 includes an arm 35 extending radially outward from the upper end of the shaft 14*a* and an operating portion 36 extending upward in the axial direction from the distal end of the arm 35. The user can slide the inner member 13 in the axial direction with respect to the outer member 11 by, for example, gripping the operating portion 36 and rotating the handle 14*b* to rotate the shaft 14*a*.

Next, the assembly of the disperser 10 will be described. To assemble the disperser 10, first, the differential screw 14 and the inner member 13 are assembled to the fixing member 12. Next, the inner member 13 assembled to the fixing member 12 is inserted into the upper end opening 11*a* of the outer member 11 from the tapered outer circumferential surface 16*a* side. The insertion portion 26 of the fixing member 12 is then inserted into the upper end opening 11*a* of the outer member 11, and the lid portion 25 of the fixing member 12 is fixed to the outer member 11. In this manner, the outer member 11, the fixing member 12, the inner member 13, and the differential screw 14 can be assembled into the disperser 10. In the process of assembling the disperser 10, the clearance between the tapered outer circumferential surface 16*a* and the tapered inner circumferential surface 15*b* can be adjusted. The adjustment of the clearance distance will be described later.

A description will then be given of the flow path 40 defined between the inner circumferential surface 15 of the outer member 11 and the outer circumferential surface 16 of the inner member 13.

When the disperser 10 is assembled, the flow path 40 is defined between the inner circumferential surface 15 of the outer member 11 and the outer circumferential surface 16 of the inner member 13, through which the fluid to be treated flows from the lower side to the upper side. The flow path 40 of the embodiment includes three regions having different shapes and functions. Specifically, the flow path 40 includes three regions: the inflow region 40*a*, the dispersion region 40*b*, and the outflow region 40*c*, in this order from bottom to top.

The inflow region 40*a* of the flow path 40 is a space through which the fluid to be treated flowing into the flow path 40 first passes, and it is defined by the inflow inner circumferential surface 15*a* of the outer member 11. The lower end opening 11_b_ of the outer member 11 communicates with the inflow region 40_a_ of the flow path 40.

The dispersion region 40_b_ of the flow path 40 is a region where the fluid to be treated can be dispersed. The dispersion region 40_b_ is defined between the tapered outer circumferential surface 16_a_ of the inner member 13 and the tapered inner circumferential surface 15_b_ of the outer member 11. The dispersion region 40_b_ extends upward continuously from the inflow region 40_a_. In this embodiment, the dispersion region 40_b_ increases in diameter from the lower side to the upper side.

The dispersion region 40_b_ of the flow path 40 includes: a reduction region 40_ba_ defined between the lower region 17 of the tapered inner circumferential surface 15_b_ and the tapered outer circumferential surface 16_a_; and a constant region 40_bb_ defined between the upper region 18 of the tapered inner circumferential surface 15_b_ and the tapered outer circumferential surface 16_a_ (see FIG. 2). The reduction region 40_ba_ is a portion of the dispersion region 40_b_ where the clearance distance decreases from the lower side to the upper side. The constant region 40_bb_ is a portion of the dispersion region 40_b_ where the clearance distance is constant from the lower side to the upper side. In other words, in this embodiment, the clearance distance in the dispersion region 40_b_ gradually decreases from the lower side to the upper side and remains constant above a predetermined height position in a cross section along the axial direction. In this manner, in the disperser 10 of the embodiment, the tapered inner circumferential surface 15_b_ and the tapered outer circumferential surface 16_a_ are formed such that the angle of one with respect to the other in the axial cross section changes in the middle of the dispersion region 40_b_ (at a predetermined height position). As a result, the dispersion region 40_b_ of the flow path 40 has portions (in this embodiment, the reduction region 40_ba_ and the constant region 40_bb_) where the clearance distance between the tapered inner circumferential surface 15_b_ and the tapered outer circumferential surface 16_a_ varies in different manners (rates). In the following, the term “clearance distance”, when simply referred to as “clearance distance”, refers to the separation distance between the tapered outer circumferential surface 16_a_ and the tapered inner circumferential surface 15_b_. Meanwhile, when referred to as “clearance distance L1”, it refers to the clearance distance in the constant region 40_bb_ of the flow path 40 (the separation distance between the tapered outer circumferential surface 16_a_ and the upper region 18 of the tapered inner circumferential surface 15_b_).

In the constant region 40_bb_ of the dispersion region 40_b_, the clearance distance L1 is preferably 0.1 μm or more and 2 mm or less. When the clearance distance L1 is set within the above range, a large shear force can be efficiently applied to the fluid to be treated to disperse it. In addition, the length L2 (see FIG. 1) of the constant region 40_bb_ of the dispersion region 40_b_ from the lower side to the upper side along the flow path direction (the flow path direction in the axial cross section) is preferably 1 mm or more, more preferably 3 mm or more, and particularly preferably 5 mm or more. When the length L2 of the constant region 40_bb_ of the dispersion region 40_b_ is set within the above range, a large shear force can be efficiently applied to the fluid to be treated to disperse it.

The outflow region 40_c_ of the flow path 40 is a space where the fluid to be treated that has passed through the dispersion region 40_b_ flows in, and it is defined between the outflow inner circumferential surface 15_c_ of the outer member 11 and the outflow outer circumferential surface 16_b_ of the inner member 13. The outflow region 40_c_ is located above the dispersion region 40_b_ and communicates with the dispersion region 40_b_. The upper part of the outflow region 40_c_ is defined by the lower surface 26_c_ of the insertion portion 26 of the fixing member 12. The separation distance between the outflow inner circumferential surface 15_c_ and the outflow outer circumferential surface 16_b_ in the outflow region 40_c_ is set larger than the clearance distance L1 in the constant region 40_bb_ of the dispersion region 40_b_.

In this embodiment, when the axial direction corresponds to the vertical direction, the inner circumferential surface 15 of the outer member 11 and the outer circumferential surface 16 of the inner member 13 have no horizontal portion where fluid flowing through the flow path 40 may accumulate. Specifically, the inner circumferential surface 15 of the outer member 11 and the outer circumferential surface 16 of the inner member 13 do not have a horizontal upper surface when the axial direction corresponds to the vertical direction.

The material for the inner circumferential surface 15 of the outer member 11 and the outer circumferential surface 16 of the inner member 13 may be selected from metal or the like as appropriate, depending on the type of fluid to be treated. For example, the material may be SUS316L that has been buffed and then electrolytically polished. Although it is preferred that the regions of the inner circumferential surface 15 of the outer member 11 and the outer circumferential surface 16 of the inner member 13 that define the constant region 40_bb_ of the dispersion region 40_b_ of the flow path 40 be made of ceramic such as silicon carbide, tungsten carbide, or alumina to prevent seizure, diamond-like carbon or the like may be used instead. In addition, it is preferred that the inner circumferential surface 15 of the outer member 11 and the outer circumferential surface 16 of the inner member 13, which define the flow path 40, be coated with a corrosion-resistant material. Examples of coatings made of corrosion-resistant materials include glass-lined coatings, fluoropolymer coatings, and ceramic coatings; fluoropolymer coatings are preferred.

Next, a description will be given of the flow of the fluid to be treated when the disperser 10 performs a dispersion process or the like.

As indicated by the white arrow in FIG. 1, the fluid to be treated is first pumped from the supply source side (not illustrated) and flows into the inflow region 40_a_ of the flow path 40 from the lower end opening 11_b_ of the outer member 11 located at the lower part of the disperser 10. After flowing through the inflow region 40_a_, the fluid then flows therefrom into the dispersion region 40_b_ located above.

Having flowed into the dispersion region 40_b_, the fluid first flows through the reduction region 40_ba_ of the dispersion region 40_b_. In the reduction region 40_ba_, the fluid moves upward along the tapered inner circumferential surface 15_b_ and the tapered outer circumferential surface 16_a_. In the reduction region 40_ba_, the clearance distance gradually decreases toward the upper side, and the fluid gradually changes its flow direction from the axial direction to the circumferential direction while maintaining the pressure and flows into the constant region 40_bb_ located above. After flowing into the constant region 40_bb_, the fluid is subjected to a shear force due to the clearance distance L1 set appropriately and is thereby dispersed. The fluid, which has maintained the pressure in the dispersion region 40_b_, flows into the outflow region 40_c_ located above.

After flowing into the outflow region 40_c_, the fluid is released under low pressure in the outflow region 40_c_. As a result, a portion of the fluid evaporates to cause flash steam, and cavitation also occurs. The flash steam and cavitation apply a shear force to the fluid to disperse it. In other words, the fluid, which has maintained the pressure in the dispersion region 40*b*, is further dispersed as it is released under low pressure in the outflow region 40*c*. The dispersed material flows out of the disperser 10 from the outlet 19 of the outflow region 40*c*.

Next, a method of using the disperser 10 will be described.

Figure 3A:
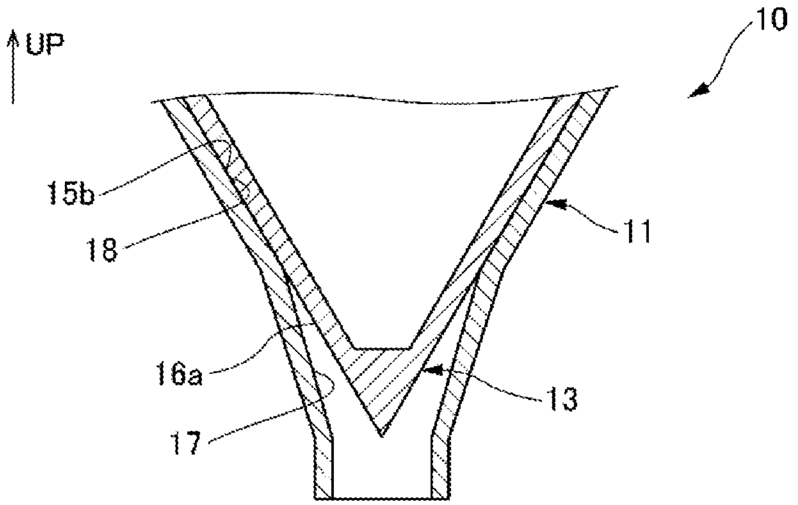
FIGS. 3A to 3C are diagrams for explaining the states of the disperser.
Figure 3B:
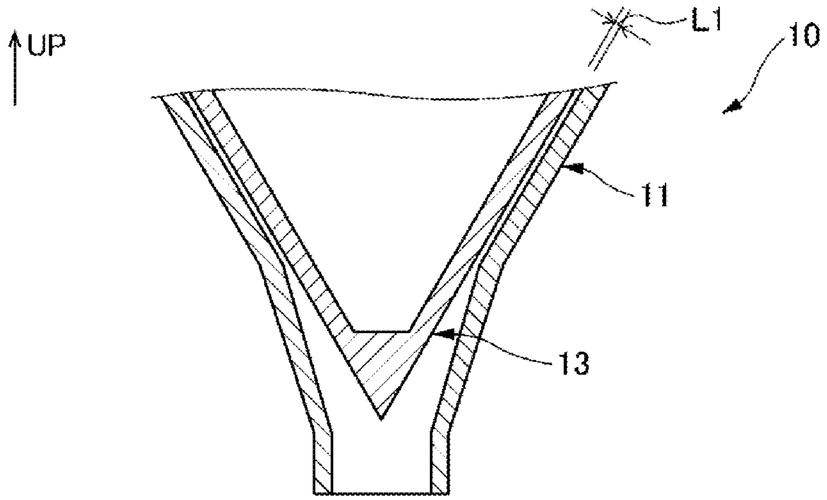
Figure 3C:
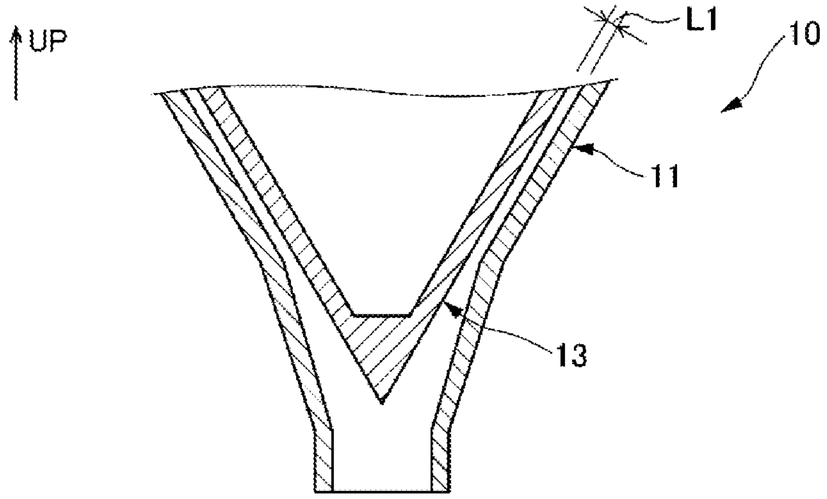

FIGS. 3A to 3C are diagrams for explaining the states of the disperser: FIG. 3A illustrates a contact state, FIG. 3B illustrates a use state, and FIG. 3C illustrates a separate state.

First, it will be described how to adjust the clearance distance L1 in the constant region 40*bb* of the flow path 40 to place the disperser 10 in the use state, and then how to clean or sterilize the disperser 10.

To adjust the clearance distance L1 in the constant region 40*bb* of the flow path 40, first, the differential screw 14 is rotated to slide the inner member 13 downward along the axial direction with respect to the outer member 11 so that the disperser 10 is brought into the contact state where the tapered outer circumferential surface 16*a* of the inner member 13 and the upper region 18 of the tapered inner circumferential surface 15*b* of the outer member 11 are in contact with each other (clearance distance L1=0) (see FIG. 3A). Thereafter, the differential screw 14 is rotated in a direction opposite to the direction of bringing the outer member 11 and the inner member 13 into contact to separate the tapered outer circumferential surface 16*a* of the inner member 13 and the upper region 18 of the tapered inner circumferential surface 15*b* of the outer member 11 from each other such that the clearance distance L1 becomes a desired one, and the disperser 10 is brought into the use state (see FIG. 3B). In this manner, the tapered outer circumferential surface 16*a* and the tapered inner circumferential surface 15*b* are separated from the contact state. Therefore, in contrast to the case where the tapered outer circumferential surface 16*a* and the tapered inner circumferential surface 15*b* are adjusted in the direction of bringing them closer together, the clearance distance L1 in the constant region 40*bb* of the flow path 40 can be finely adjusted easily. Thus, it is possible to set the clearance distance L1 to a desired one and to place the disperser 10 in the use state. The amount (angle) of rotation of the differential screw 14 at this time can be calculated from the desired clearance distance L1, the pitch of the threads of the first male threaded portion 33 of the differential screw 14 (the female threaded portion 27 of the fixing member 12), and the pitch of the threads of the second male threaded portion 34 (the female threaded portion 31 of the inner member 13). Specifically, the difference in thread pitch between the first male threaded portion 33 and the second male threaded portion 34 of the differential screw 14 corresponds to the distance that the inner member 13 moves with respect to the outer member 11 when the differential screw 14 is turned one revolution (rotated 360 degrees). Accordingly, the amount (angle) of rotation of the differential screw 14 can be calculated from the distance that the inner member 13 moves during one revolution and the desired clearance distance L1.

To clean or sterilize the disperser 10, the differential screw 14 is further rotated to bring the disperser 10 from the use state into the separate state where the clearance distance is further apart than in the used state (see FIG. 3C). Thereby, the tapered inner circumferential surface 15*b* and the tapered outer circumferential surface 16*a* can be separated to an extent that allows cleaning or sterilization. Thus, the disperser 10 can be cleaned and sterilized in place without disassembling the outer member 11 and the inner member 13.

As described above, the disperser 10 can be brought into the contact state where the tapered outer circumferential surface 16*a* and the tapered inner circumferential surface 15*b* are in contact with each other (see FIG. 3A) by rotating the differential screw 14. The disperser 10 can also be placed in the use state where the clearance distance is small (see FIG. 3B) by rotating the differential screw 14. In addition, the disperser 10 can be placed in the separate state where the clearance distance is larger than in the use state (see FIG. 3C) by further rotating the differential screw 14 from the use state. That is, the disperser 10 of the embodiment can be selectively placed in any one of the contact state, the use state, and the separate state without disassembling the outer member 11 and the inner member 13.

In the disperser 10 configured as described above, the tapered inner circumferential surface 15*b* and the tapered outer circumferential surface 16*a* are formed such that the angle of one with respect to the other in the axial cross section changes in the middle of the dispersion region 40*b*. As a result, the dispersion region 40*b* of the flow path 40 has portions where the clearance distance between the tapered inner circumferential surface 15*b* and the tapered outer circumferential surface 16*a* varies in different manners (in this embodiment, the reduction region 40*ba* and the constant region 40*bb*). For example, by virtue of the reduction region 40*ba* provided in the dispersion region 40*b*, the flow direction of the fluid to be treated can be gradually changed from the axial direction to the circumferential direction. Additionally, by virtue of the constant region 40*bb* provided in the dispersion region 40*b*, when the clearance distance L1 is set appropriately, a large shear force can be efficiently applied to the fluid to be treated to disperse it, and a finely dispersed material (e.g., nanoparticles) can be obtained.

In addition, after flowing into the outflow region 40*c* from the dispersion region 40*b*, the fluid to be treated is released under low pressure, which causes flash steam and cavitation. The flash steam and cavitation apply a shear force to the fluid to disperse it, and the fluid can be further dispersed.

Moreover, the tapered inner circumferential surface 15*b* and the tapered outer circumferential surface 16*a* define the flow path 40. Therefore, in contrast to the case where one of them is a non-tapered surface (e.g., a cylindrical surface extending along the axial direction), the clearance distance can be adjusted by moving the outer member 11 and the inner member 13 in the axial direction relative to each other.

Further, the clearance distance can be finely adjusted as it is adjusted by using the differential screw 14. Thus, the clearance distance can be set appropriately to efficiently apply a large shear force to the fluid to be treated to disperse it, and a finely dispersed material (e.g., nanoparticles) can be obtained.

Furthermore, when the axial direction (predetermined direction) corresponds to the vertical direction, the inner circumferential surface 15 of the outer member 11 and the outer circumferential surface 16 of the inner member 13 have no horizontal portion where fluid flowing through the flow path 40 may accumulate. This prevents any cleaning agent (condensed water of pure steam, etc.) from remaining in the flow path 40 at the time of cleaning, for example, the inner circumferential surface 15 of the outer member 11 and the outer circumferential surface 16 of the inner member 13.

While the fluid to be treated is being dispersed, the outer member 11 and the inner member 13 are not moved relative to each other. Therefore, in contrast to the case where the outer member and the inner member are rotated relative to each other during the dispersion process, a finely dispersed material can be obtained from the fluid with low power.

As described above, while the fluid to be treated is being dispersed, the outer member 11 and the inner member 13 are not moved relative to each other. That is, the outer member 11 and the inner member 13 have no sliding parts that slide against each other during use. Therefore, it is possible to simplify the structure and suppress the generation of foreign substances. Since the disperser 10 can suppress the generation of foreign substances and can be cleaned and sterilized in place as described above, it can be used for pharmaceutical manufacturing equipment (in particular, injection manufacturing equipment).

Specifically, the processes of producing pharmaceuticals, cosmetics, food, chemical products, electronic components, and the like often include a dispersion process that produces fine particles such as nanocrystals, nanoemulsions, liposomes, and nanospheres. There are various requirements for a disperser that enables the production of such fine particles, especially nanoparticles. For example, a disperser used to produce vaccines such as new coronavirus vaccines must be cleaned and sterilized in place without disassembling its parts to eliminate human error, because the vaccines are injections. In addition, since pure steam or the like flows through the flow path 40 during sterilization, thermal countermeasures are required for the inner circumferential surface 15 of the outer member 11 and the outer circumferential surface 16 of the inner member 13 that define the flow path 40. There is also a need to drain condensed water of pure steam without leaving residue. As described above, the disperser 10 of the present disclosure can satisfy these requirements.

It is also required to reliably prevent foreign substances (e.g., foreign substances generated from sliding parts, etc.) from mixing with the finely dispersed material. For this reason, it is difficult to use a dispersing device such as a bead mill or an ultrasonic oscillator. In a bead mill, foreign substances such as bead fragments and wear debris may be generated and mixed into the material being treated. In an ultrasonic disperser, erosion occurs due to cavitation, resulting in the generation of foreign substances, which may be mixed into the material being treated. As described above, the disperser 10 of the present disclosure can satisfy these requirements.

Incidentally, manufacturers of pharmaceuticals and similar products are required to perform validation to verify that their pharmaceuticals and medical devices are manufactured using the correct processes and methods. As described above, the disperser 10 of the present disclosure can satisfy various requirements for a disperser used in the production of pharmaceutical products or the like, and therefore it can also satisfy requirements for validation.

In addition, the sealing member 29 seals between the sealing outer circumferential surface 16*c* of the inner member 13 and the inner circumferential surface 26*b* of the insertion portion 26 of the fixing member 12. Thus, dust and the like can be prevented from entering the fluid to be treated in the flow path 40 from the internal space of the inner member 13 in which the differential screw 14 and the like are located.

As described above, according to the embodiment, shear force can be efficiently applied to a material to be treated with low power to produce fine particles, particularly nanoparticles.

Figure 4:
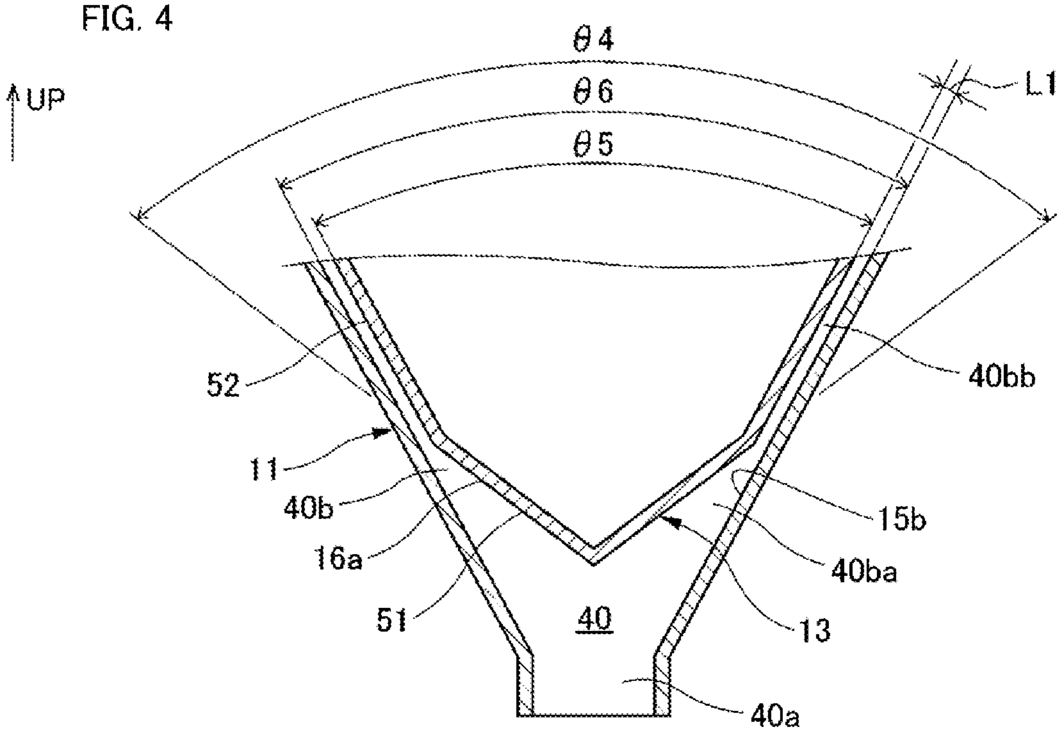
FIG. 4 is an enlarged view illustrating a modification of the main parts of the disperser and corresponds to FIG. 2.

According to the embodiment, the tapered inner circumferential surface 15*b* of the outer member 11 has two regions (the lower region 17 and the upper region 18) with different taper angles, while the tapered outer circumferential surface 16*a* of the inner member 13 has a constant taper angle from the upper end to the lower end, thereby providing the dispersion region 40*b* of the flow path 40 with the reduction region 40*ba* and the constant region 40*bb*; however, the embodiment is not so limited. For example, as illustrated in FIG. 4, the tapered outer circumferential surface 16*a* of the inner member 13 may have a lower region 51 with a larger taper angle θ4 and an upper region 52 with a taper angle θ5 smaller than that of the lower region 51 (θ4>θ5). In addition, the tapered inner circumferential surface 15*b* of the outer member 11 may have a taper angle θ6 that is constant from the upper end to the lower end, and the taper angle θ6 may be set to be the same as the taper angle θ5 of the upper region 52 of the tapered outer circumferential surface 16*a*. In this manner, the dispersion region 40*b* of the flow path 40 may be provided with the reduction region 40*ba* and the constant region 40*bb*.

According to the embodiment, the tapered inner circumferential surface 15*b* and the tapered outer circumferential surface 16*a* are formed such that the angle of one with respect to the other in the axial cross section changes in the middle of the dispersion region 40*b*, and they form two different angles; however, the embodiment is not so limited. The tapered inner circumferential surface 15*b* and the tapered outer circumferential surface 16*a* only need to form at least two different angles in the axial cross section, and they may form three or more different angles.

According to the embodiment, the dispersion region 40*b* of the flow path 40 is provided with the constant region 40*bb* where the clearance distance is constant; however, the embodiment is not so limited. The tapered inner circumferential surface 15*b* and the tapered outer circumferential surface 16*a* only need to be formed such that the angle of one with respect to the other changes to a different angle in the middle of the dispersion region 40*b*.

According to the embodiment, one of the tapered inner circumferential surface 15*b* and the tapered outer circumferential surface 16*a* has a taper angle which changes at a predetermined height position in the axial cross section, and the other has a taper angle which is constant from the upper end to the lower end; however, the embodiment is not so limited. For example, the taper angles of both the tapered inner circumferential surface 15*b* and the tapered outer circumferential surface 16*a* may be changed at a predetermined height position so that the dispersion region 40*b* of the flow path 40 is provided with portions where the clearance distance varies in different manners.

Figure 5:
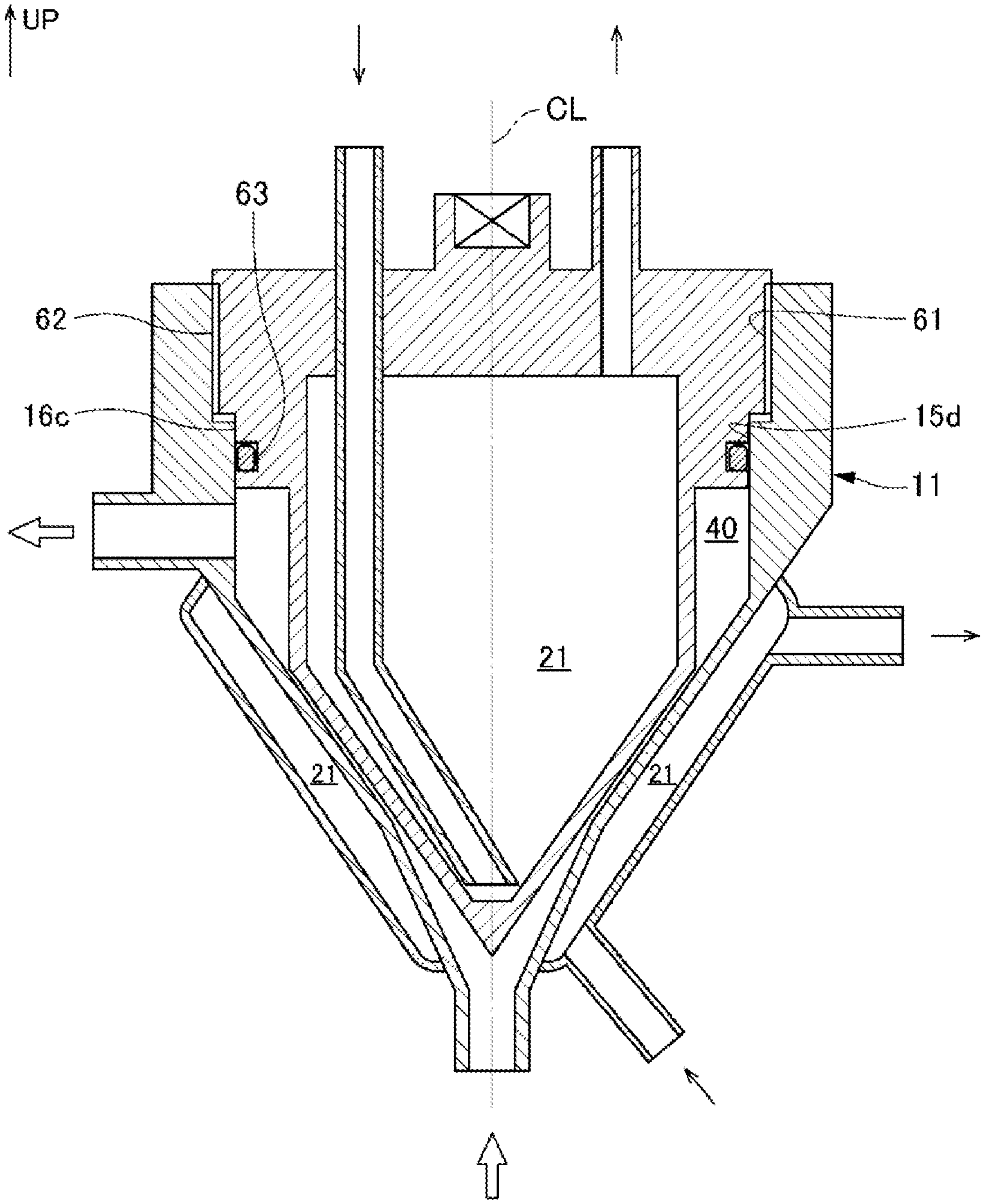
FIG. 5 is an axial cross-sectional view of the disperser illustrating a modification of a clearance adjustment part.

According to the embodiment, the disperser 10 includes the fixing member 12 that is fixed to the outer member 11 and slidably supports the inner member 13 and the differential screw 14 that slides the inner member 13 with respect to the fixing member 12, and the fixing member 12 and the differential screw 14 are designed to function as clearance adjustment parts; however, the clearance adjustment parts are not limited to them. For example, as illustrated in FIG. 5, a female threaded portion 61 (clearance adjustment part) may be provided above the sealing inner circumferential surface 15*d* of the outer member 11, and a male threaded portion 62 (clearance adjustment part) that is threaded into the female threaded portion 61 may be provided above the sealing outer circumferential surface 16*c* of the inner member 13. The female threaded portion 61 and the male threaded portion 62 serve as assembling parts for assembling the outer member 11 and the inner member 13. In addition, since the female threaded portion 61 and the male threaded portion 62 allow the outer member 11 and the inner member 13 to be rotated relative to each other and moved in the axial direction, they also function as clearance adjustment parts. A sealing member 63 (e.g., an O-ring) is provided between the flow path 40 and the female threaded portion 61 and the male threaded portion 62. In this case, the number of parts can be reduced because the female threaded portion 61 and the male threaded portion 62 for assembling the outer member 11 with the inner member 13 can function as clearance adjustment parts.

Additionally, as illustrated in FIG. 5, both the outer member 11 and the inner member 13 may be provided with the jacket 21 (space) to adjust the temperature of the fluid to be treated (fluid) in the flow path 40. The jacket 21 allows the flow of other fluids such as steam, hot water, cold water, gas (nitrogen gas, etc.), or other heat transfer media to adjust the temperature of the fluid to be treated (fluid).

A second embodiment of the present invention will be described below with reference to the accompanying drawings. A disperser 70 of this embodiment differs from that of the first embodiment in that its tapered inner circumferential surface 75*c* and tapered outer circumferential surface 76*c* are tapered from the bottom to the top. Like parts or elements as those in the first embodiment will be designated by like reference numerals, and the description thereof will be omitted.

Figure 6:
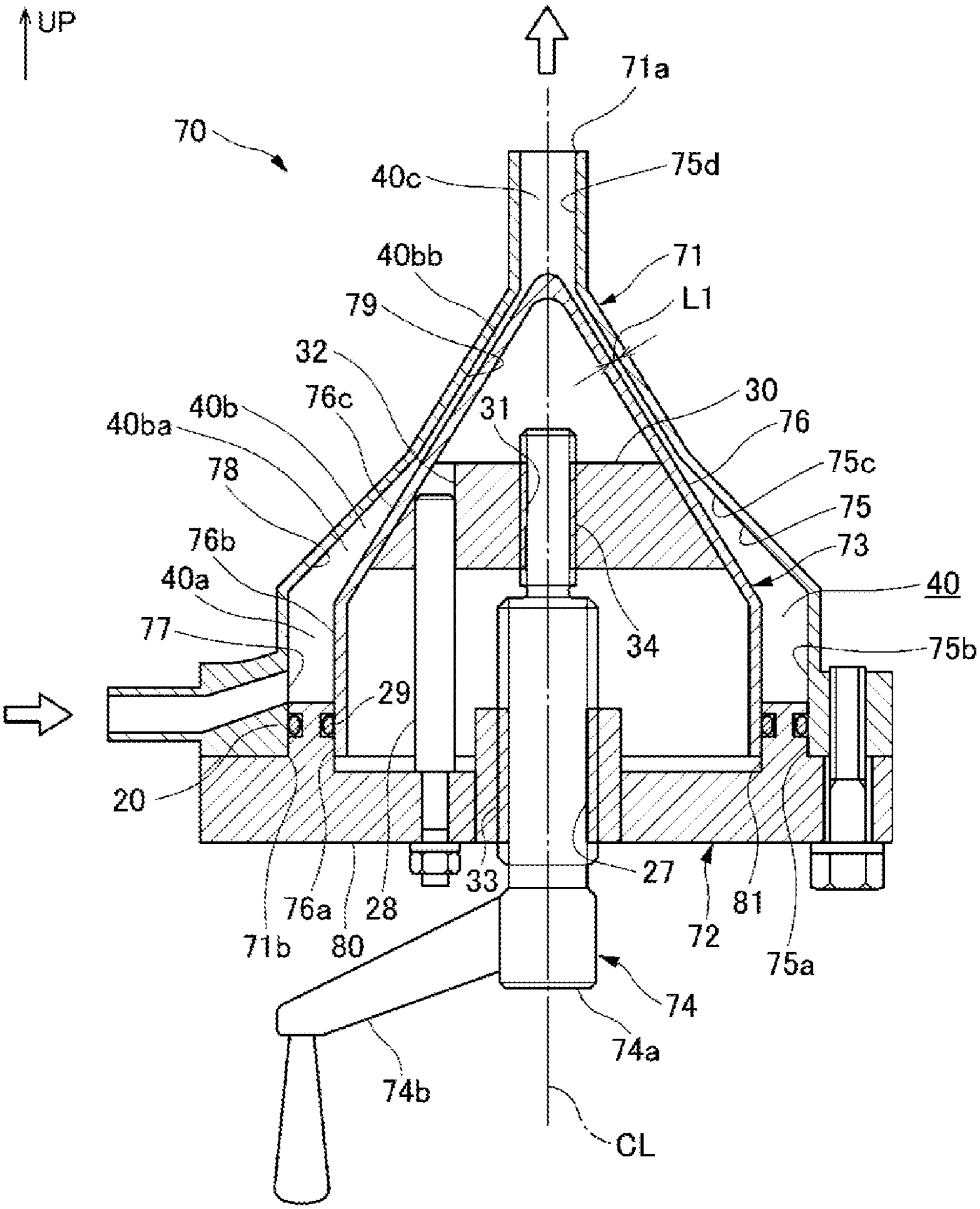
FIG. 6 is an axial cross-sectional view of a disperser according to a second embodiment of the present invention.

FIG. 6 is an axial cross-sectional view of a disperser according to the second embodiment of the present invention.

As illustrated in FIG. 6, the disperser 70 of the second embodiment includes an outer member 71, a fixing member 72 (clearance adjustment part), an inner member 73, and a differential screw 74 (clearance adjustment part). The outer member 71 is formed in a cylindrical shape extending in a predetermined direction (the vertical direction in this embodiment). The fixing member 72 is fixed to the outer member 71. The inner member 73 is located radially inside the outer member 71 and is slidably supported by the fixing member 72. The differential screw 74 is attached to the fixing member 72 and the inner member 73.

The outer member 71 and the inner member 73 are concentrically arranged so that their central axes CL coincide. There is a gap (space) between an inner circumferential surface 75 of the outer member 71 and an outer circumferential surface 76 of the inner member 73, and the gap serves as the flow path 40 through which a fluid to be treated flows. The flow path 40 allows the fluid to be treated to flow from the lower side (one side in the predetermined direction) to the upper side (the other side in the predetermined direction). Unless otherwise specified, the following describes the structure of the disperser 70 in the use state.

The outer member 71 is formed in a cylindrical shape whose central axis CL extends in a predetermined direction (the vertical direction in this embodiment). The outer member 71 has an upper end opening 71*a* at the upper end, a lower end opening 71*b* at the lower end, and the inner circumferential surface 75 extending between the upper end opening 71*a* and the lower end opening 71*b*. The upper end opening 71*a* and the lower end opening 71*b* are arranged to be concentric with the central axis CL. In this embodiment, the upper end opening 71*a* is formed to have a smaller diameter than the lower end opening 71*b*. The lower end opening 71*b* of the outer member 71 serves as an insertion port for inserting the inner member 73 into the outer member 71.

The inner circumferential surface 75 of the outer member 71 includes four regions, one on top of another, each having a surface with a different function. In other words, the inner circumferential surface 75 of the outer member 71 includes four surfaces with different functions: a sealing inner circumferential surface 75*a*, an inflow inner circumferential surface 75*b*, the tapered inner circumferential surface 75*c*, and an outflow inner circumferential surface 75*d*, in this order from bottom to top. That is, the outer member 71 has the tapered inner circumferential surface 75*c* as a part of the inner circumferential surface 75. The inflow inner circumferential surface 75*b*, the tapered inner circumferential surface 75*c*, and the outflow inner circumferential surface 75*d* of the outer member 71 define the radially outer side of the flow path 40.

The sealing inner circumferential surface 75*a* of the outer member 71 is located below the flow path 40 and extends upward from the lower end opening 71*b* of the outer member 71. In this embodiment, the sealing inner circumferential surface 75*a* is formed in a cylindrical shape extending continuously from the lower end opening 71*b* of the outer member 71. The sealing inner circumferential surface 75*a* of the embodiment is in close proximity to or in contact with the outer circumferential surface 26*a* of the insertion portion 26 of the fixing member 72 (described later) and does not define the flow path 40. The fixing member 72 is provided with the sealing member 20 (e.g., an O-ring) which comes into contact with the sealing inner circumferential surface 75*a*. Thereby, the sealing inner circumferential surface 75*a* restricts the flow of the fluid downward from the flow path 40. In this embodiment, the fixing member 72 is provided with the sealing member 20; however, the embodiment is not so limited, and the sealing inner circumferential surface 75*a* of the outer member 71 may be provided with the sealing member 20.

The inflow inner circumferential surface 75*b* of the outer member 71 is located below the tapered inner circumferential surface 75*c* and extends continuously from the upper end of the sealing inner circumferential surface 75*a* to the lower end of the tapered inner circumferential surface 75*c*. In this embodiment, the inflow inner circumferential surface 75*b* is formed in a cylindrical shape. The inflow inner circumferential surface 75*b* defines the radially outer side of the inflow region 40*a* into which the fluid to be treated first flows. The inflow inner circumferential surface 75*b* is provided with an inlet 77 for the fluid to be treated. The inlet 77 is connected to a supply source (not illustrated) for pumping the fluid to be treated and allows the fluid to flow into the flow path 40. In this embodiment, the supply source (not illustrated) pumps the fluid to be treated from the inlet 77 into the flow path 40 at a pressure of 0.5 MPaG.

The tapered inner circumferential surface 75*c* of the outer member 71 is a tapered (conical) surface and extends upward continuously from the inflow inner circumferential surface 75*b*. In this embodiment, the tapered inner circumferential surface 75*c* is tapered from the bottom to the top. The tapered inner circumferential surface 75*c* defines the radially outer side of a space (the dispersion region 40*b*) in which the fluid to be treated can be dispersed. The vertex (not illustrated) of the tapered profile of the tapered inner circumferential surface 75*c* is located on the central axis CL.

In this embodiment, the tapered inner circumferential surface 75*c* has two regions with different taper angles: an upper region and a lower region. Specifically, the tapered inner circumferential surface 75*c* has a lower region 78 with a larger taper angle and an upper region 79 with a taper angle smaller than that of the lower region 78. The upper region 79 extends upward from the upper end of the lower region 78 (the lower end of the upper region 79). In other words, the taper angle of the tapered inner circumferential surface 75*c* changes at a predetermined height position in the middle of the tapered inner circumferential surface 75*c*.

The outflow inner circumferential surface 75*d* of the outer member 71 extends continuously from the upper end of the tapered inner circumferential surface 75*c* to the upper end opening 71*a* of the outer member 71 located above. In this embodiment, the outflow inner circumferential surface 75*d* is formed in a cylindrical shape. The outflow inner circumferential surface 75*d* defines the radially outer side of a space (the outflow region 40*c*) in which the fluid is present before flowing out of the flow path 40. The diameter of the outflow region 40*c* is set larger than the separation distance (clearance distance L1) between the upper region 79 of the tapered inner circumferential surface 75*c* and the tapered outer circumferential surface 76*c* (described later) of the inner member 73. The upper end opening 71*a* of the outer member 71 serves as an outlet through which the fluid flows out of the flow path 40.

The fixing member 72 is fixed (e.g., fastened and secured) to the outer member 71. The fixing member 72 includes a lid portion 80 that closes the lower end opening 71*b* of the outer member 71 and a cylindrical insertion portion 81 that is inserted into the lower end opening 71*b* of the outer member 71 from below. Note that the lid portion 80 and the insertion portion 81 of the fixing member 72 have substantially the same configuration as the lid portion 25 and the insertion portion 26 of the fixing member 12 of the first embodiment, and therefore the description thereof will not be repeated.

The inner member 73 is located radially inside the outer member 71 (the internal space of the outer member 71) and is slidably supported by the fixing member 72. In other words, the inner member 73 is movable in the axial direction with respect to the outer member 71 through the fixing member 72. In this embodiment, the inner member 73 is inserted into the internal space of the outer member 71 from the lower end opening 71*b* of the outer member 71 while being supported by the fixing member 72. The inner member 73 has the outer circumferential surface 76 that defines the flow path 40 between it and the inner circumferential surface 75 of the outer member 71.

The inner member 73 of the embodiment is formed in a bottomed cylindrical shape with an opening at the bottom. The inner member 73 is provided with the supported portion 30 which is supported by the differential screw 74 in its internal space.

The outer circumferential surface 76 of the inner member 73 defines the radially inner side of the flow path 40 and includes three regions, one on top of another, each having a surface with a different function. In other words, the outer circumferential surface 76 of the inner member 73 includes three surfaces with different functions: a sealing outer circumferential surface 76*a*, an inflow outer circumferential surface 76*b*, and the tapered outer circumferential surface 76*c*, in this order from bottom to top. That is, the inner member 73 has the tapered outer circumferential surface 76*c* as a part of the outer circumferential surface 76.

The sealing outer circumferential surface 76*a* of the inner member 73 is located below the flow path 40 and extends upward from the lower end of the inner member 73. In this embodiment, the sealing outer circumferential surface 76*a* is formed in a cylindrical shape. The sealing outer circumferential surface 76*a* is formed to have a slightly smaller diameter than the inner circumferential surface of the insertion portion 81 of the fixing member 72, and it faces the inner circumferential surface of the insertion portion 81. The sealing outer circumferential surface 76*a* is in close proximity to or in contact with the inner circumferential surface of the insertion portion 81 of the fixing member 72 and does not define the flow path 40. The sealing member 29 on the inner circumferential surface of the insertion portion 81 of the fixing member 72 comes into contact with the sealing outer circumferential surface 76*a*. While in contact with the sealing outer circumferential surface 76*a* of the inner member 73 over the entire circumference, the sealing member 29 restricts the flow of the fluid downward from the flow path 40.

The inflow outer circumferential surface 76*b* of the inner member 73 extends upward from the upper end of the sealing outer circumferential surface 76*a*. In this embodiment, the inflow outer circumferential surface 76*b* is formed in a cylindrical shape. The inflow outer circumferential surface 76*b* is located at a position spaced radially inward from the inflow inner circumferential surface 75*b* of the outer member 71 and defines a space (the inflow region 40*a*) between it and the inflow inner circumferential surface 75*b*.

The tapered outer circumferential surface 76*c* of the inner member 73 is a tapered (conical) surface and faces the tapered inner circumferential surface 75*c* of the outer member 71 in a state of being spaced radially inward from the tapered inner circumferential surface 75*c*. In this embodiment, the tapered outer circumferential surface 76*c* extends continuously from the vertex of the upper end of the inner member 73 such that its diameter increases downward. In other words, the tapered outer circumferential surface 76*c* of the embodiment is tapered from the bottom to the top. Thus, the dispersion region 40*b* of the flow path 40 is defined between the tapered outer circumferential surface 76*c* and the tapered inner circumferential surface 75*c*. In this embodiment, the inner member 73 is formed such that the vertex of the tapered profile of the tapered outer circumferential surface 76*c* corresponds to the upper end of the inner member 73. The vertex of the tapered profile of the tapered outer circumferential surface 76*c* is located on the central axis CL.

In this embodiment, the taper angle of the tapered outer circumferential surface 76*c* is set to be constant from the upper end to the lower end, differently from the tapered inner circumferential surface 75*c*. The taper angle of the tapered outer circumferential surface 76*c* is set to be the same as the taper angle of the upper region 79 of the tapered inner circumferential surface 75*c*.

The differential screw 74 is a member that allows the clearance distance between the tapered inner circumferential surface 75*c* and the tapered outer circumferential surface 76*c* to be adjusted by moving the inner member 73 with respect to the outer member 71. The differential screw 74 integrally includes a shaft 74*a* and a handle 74*b*. Note that the shaft 74*a* and the handle 74*b* have substantially the same configuration as the shaft 14*a* and the handle 14*b* of the differential screw 14 of the first embodiment, and therefore the description thereof will not be repeated.

In this embodiment, the dispersion region 40*b* of the flow path 40 decreases in diameter from the bottom to the top.

The disperser 70 configured as described above achieves the same effects as the disperser 10 of the first embodiment. That is, according to the embodiment, shear force can be efficiently applied to a material to be treated with low power to produce fine particles, particularly nanoparticles.

While preferred embodiments of the invention have been described and illustrated, the invention is not limited to the embodiments disclosed herein. Various changes, modifications, and alterations may be made within the scope of the invention as defined in the appended claims. That is, many variations and modifications thereof may be made by those skilled in the art without departing from the spirit and scope of the invention. All such variations and modifications are intended to be included within the scope of the invention as defined in the appended claims.

LIST OF REFERENCE SIGNS

10, 70 Disperser
11, 71 Outer member
12, 72 Fixing member (clearance adjustment part)
13, 73 Inner member
14, 74 Differential screw (clearance adjustment part)
15, 75 Inner circumferential surface
15*b*, 75*c* Tapered inner circumferential surface
16, 76 Outer circumferential surface
16*a*, 76*c* Tapered outer circumferential surface
21 Jacket
40 Flow path
40*b* Dispersion region
40*ba* Reduction region
40*bb* Constant region
61 Female threaded portion (clearance adjustment part)
62 Male threaded portion (clearance adjustment part)

The invention claimed is:

1. A disperser, comprising:

a cylindrical outer member extending in a predetermined direction and having a tapered inner circumferential surface as a part of an inner circumferential surface thereof; and an inner member located radially inside the outer member and having a tapered outer circumferential surface as a part of an outer circumferential surface thereof, the tapered outer circumferential surface facing the tapered inner circumferential surface of the outer member;

wherein the disperser is configured to allow a clearance distance between the tapered inner circumferential surface and the tapered outer circumferential surface to be adjusted by moving the outer member and the inner member relative to each other in the predetermined direction; wherein a flow path is formed between the inner circumferential surface of the outer member and the outer circumferential surface of the inner member, through which fluid flows from one side to an other side in the predetermined direction, the flow path includes a dispersion region defined by the tapered inner circumferential surface and the tapered outer circumferential surface, the tapered inner circumferential surface and the tapered outer circumferential surface are formed such that an angle therebetween in a cross section in the predetermined direction changes in a middle of the dispersion region, and the dispersion region of the flow path includes:

a reduction region where the clearance distance decreases from the one side to the other side, and a constant region extending continuously from the reduction region to the other side, where the clearance distance is constant.

2. The disperser according to claim 1, wherein the disperser includes:

a lid portion having a through hole in which a female threaded portion is formed, wherein the lid portion supports the inner member to be slidable in the predetermined direction and is fixed to the outer member, and a differential screw threaded into the through hole, wherein the differential screw is configured to slide the inner member in the predetermined direction with respect to the lid portion.

3. The disperser according to claim 1, wherein the disperser can be used to selectively place the disperser in any one of the following states without disassembling the outer member and the inner member:

a contact state in which the tapered inner circumferential surface and the tapered outer circumferential surface are in contact with each other, a use state in which the disperser is used and the clearance distance is a first distance, and a separate state in which the clearance distance is a second distance, wherein the first distance is smaller than the second distance.

4. The disperser according to claim 1, wherein the constant region of the dispersion region of the flow path has a length of 1 mm or more from the one side to the other side along a flow path direction in the cross section in the predetermined direction.

5. The disperser according to claim 1, wherein in the constant region of the dispersion region of the flow path, the clearance distance is 0.1 μm or more and 2 mm or less.

6. The disperser according to claim 1, wherein regions of the tapered inner circumferential surface and the tapered outer circumferential surface that define the constant region of the dispersion region of the flow path are made of ceramic.

7. The disperser according to claim 1, wherein the inner circumferential surface of the outer member and the outer circumferential surface of the inner member that define the flow path have no horizontal portion that is horizontal when the predetermined direction corresponds to a vertical direction.

8. The disperser according to claim 1, wherein the inner circumferential surface of the outer member and the outer circumferential surface of the inner member that define the flow path are covered with a coating made of a corrosion-resistant material.

9. The disperser according to claim 8, wherein the coating is a fluoropolymer coating.

10. The disperser according to claim 1, wherein at least one of the outer member and the inner member has a jacket through which another fluid can flow to adjust temperature of the fluid flowing through the flow path.

11. A method for using the disperser of claim 3, comprising adjusting the clearance distance to place the disperser in the use state, wherein the adjusting includes:

bringing the outer member and the inner member into contact with each other to bring the disperser into the contact state; and thereafter separating the tapered inner circumferential surface from the tapered outer circumferential surface to bring the disperser into the use state.

12. A method for using the disperser of claim 3, comprising separating the outer member and the inner member from each other to bring the disperser into the separate state for cleaning or sterilization of the flow path.

* * * * *